(12) United States Patent
Phinney

(10) Patent No.: US 6,334,990 B1
(45) Date of Patent: Jan. 1, 2002

(54) FORMULATION OF POTASSIUM SULFATE, SODIUM CARBONATE AND SODIUM BICARBONATE FROM POTASH BRINE

(75) Inventor: Robin Phinney, Calgary (CA)

(73) Assignee: Airborne Industrial Minerals Inc., Calgary (CA)

( * ) Notice: Subject to any disclaimer, the term of this patent is extended or adjusted under 35 U.S.C. 154(b) by 0 days.

(21) Appl. No.: 09/422,271

(22) Filed: Oct. 21, 1999

(51) Int. Cl.[7] .................................................. C01D 5/00
(52) U.S. Cl. ....................... 423/551; 423/421; 423/427; 423/430; 423/552; 423/637
(58) Field of Search ................. 423/427, 230, 423/551, 552, 637, 430, 421

(56) References Cited

U.S. PATENT DOCUMENTS

| | | | |
|---|---|---|---|
| 1,824,361 A | 9/1931 | Morse | 423/551 |
| 1,922,682 A | 8/1933 | Holz | 23/121 |
| 1,936,070 A | 11/1933 | Ritchie et al. | 23/121 |
| 1,990,896 A | 2/1935 | Connell | 23/121 |
| 2,882,128 A | 4/1959 | Lafont | 23/121 |
| 3,206,297 A | 9/1965 | O'Connor | 71/28 |
| 3,369,867 A | 2/1968 | May | 23/121 |
| 3,429,657 A | 2/1969 | George et al. | 23/63 |
| 3,436,175 A | 4/1969 | Atwood | 23/119 |
| 3,502,458 A | 3/1970 | Schenk | 71/64 |
| 3,527,592 A | 9/1970 | McPherson et al. | 71/24 |
| 3,528,767 A | 9/1970 | Garrett | 23/89 |
| 3,533,776 A | 10/1970 | Coates | 71/28 |
| 3,539,326 A | 11/1970 | Otsuka et al. | 71/28 |
| 3,544,296 A | 12/1970 | Karcher | 71/24 |
| 3,578,399 A | 5/1971 | Boeglin | 23/121 |
| 3,617,243 A | 11/1971 | Neitzel | 71/63 |
| 3,656,891 A | 4/1972 | Chemtob | 23/59 |
| 3,687,639 A | 8/1972 | Barlow et al. | 23/300 |
| 3,711,254 A | 1/1973 | McGowan et al. | 23/313 |
| 3,728,438 A | 4/1973 | Nasygrov | 423/551 |
| 3,843,772 A | 10/1974 | Boeglin | 423/551 |
| 3,853,490 A | 12/1974 | Boeglin et al. | 23/313 |
| 3,872,002 A | 3/1975 | Musgrove | 210/59 |
| 3,892,552 A | 7/1975 | Gay, Jr. | 71/1 |
| 3,895,920 A | 7/1975 | Garrett | 23/298 |
| 3,998,935 A | 12/1976 | Adams et al. | 423/552 |
| 4,045,543 A | 8/1977 | Sardisco | 423/482 |
| 4,129,642 A | 12/1978 | Neitzel | 423/199 |
| 4,174,382 A | 11/1979 | Menche | 423/552 |
| 4,215,100 A | 7/1980 | Sokolov et al. | 423/552 |
| 4,268,492 A | 5/1981 | Sardisco et al. | 423/482 |
| 4,303,619 A | 12/1981 | Kobayashi et al. | 422/205 |
| 4,313,753 A | 2/1982 | Segawa et al. | 71/61 |
| 4,323,386 A | 4/1982 | Heggabo et al. | 71/35 |
| 4,342,737 A | 8/1982 | Iwashita et al. | 423/522 |
| 4,385,920 A | 5/1983 | Dancy et al. | 71/36 |
| 4,420,468 A | 12/1983 | Yamashita et al. | 423/482 |
| 4,440,560 A | 4/1984 | Nakamura et al. | 71/24 |
| 4,529,434 A | 7/1985 | Ashmead | 71/34 |
| 4,533,536 A | 8/1985 | Bichara et al. | 423/551 |
| 4,554,139 A | 11/1985 | Worthington et al. | 423/166 |
| 4,562,058 A | 12/1985 | Dancy et al. | 423/551 |
| 4,588,573 A | 5/1986 | Worthington et al. | 423/552 |
| 4,668,242 A | 5/1987 | Vitellaro et al. | 71/64.05 |
| 4,707,347 A | 11/1987 | Vajna et al. | 423/552 |
| 4,710,219 A | 12/1987 | Wahlberg et al. | 71/11 |
| 4,804,401 A | 2/1989 | Wahlberg et al. | 71/11 |
| 5,152,821 A | 10/1992 | Walter | 71/33 |
| 5,298,050 A | 3/1994 | McLaughlin et al. | 71/63 |
| 5,366,534 A | 11/1994 | Fischbein et al. | 71/63 |
| 5,449,506 A | 9/1995 | Berry et al. | 423/421 |
| 5,529,764 A | 6/1996 | Lampert et al. | 423/552 |
| 5,549,876 A | 8/1996 | Zisner et al. | 423/199 |
| 5,552,126 A | 9/1996 | Efraim et al. | 423/199 |
| 5,571,303 A | 11/1996 | Bexton | 71/34 |
| 5,871,551 A | 2/1999 | Rodriguez-Leon | 23/302 |

FOREIGN PATENT DOCUMENTS

| | | | | |
|---|---|---|---|---|
| FR | 787713 | * | 9/1935 | |
| GB | 435772 | * | 9/1935 | 423/551 |
| GB | 2 068 918 A | * | 8/1981 | 423/552 |
| WO | WO 99/65823 | | 12/1999 | C01D/5/08 |

* cited by examiner

*Primary Examiner*—Steven P. Griffin
*Assistant Examiner*—Timothy C. Vanoy
(74) *Attorney, Agent, or Firm*—Paul S. Sharpe; Marks & Clerk

(57) ABSTRACT

A process for the preparation of potassium sulfate, sodium bicarbonate and sodium carbonate. The process involves the treatment of potash brines by the reaction of sodium chloride and potassium chloride with calcium sulfate and sodium sulfate. Syngenite precipitate ($CaSO_4 \cdot K_2SO_4 \cdot \chi H_2O$) is produced and a first filtrate containing sodium chloride and potassium chloride. The syngenite precipitate is reacted with ammonium bicarbonate at between 70° C. and 100° C., with the result being calcium carbonate precipitate and a second filtrate containing ammonium sulfate and potassium sulfate. The second filtrate is cooled to a temperature of between 20° C. and 50° C. and treated with potassium chloride. A potassium sulfate precipitate results. The sodium bicarbonate is precipitated from the first filtrate by the addition of ammonium bicarbonate to the first precipitate. The sodium bicarbonate may be calcined to form sodium carbonate.

16 Claims, 2 Drawing Sheets

FORMULATION OF POTASSIUM SULFATE, SODIUM CARBONATE AND SODIUM BICARBONATE FROM POTASH BRINE

FIELD OF THE INVENTION

The present invention relates to a method for formulating potassium sulfate, sodium bicarbonate and sodium carbonate and more particularly, the present invention relates to a method for formulating such compounds from spent potash brine.

BACKGROUND OF THE INVENTION

In a typical potash plant approximately between 85% and 90% of potassium chloride is recovered. The residual is lost due to washing with water sodium chloride from the sodium chloride during purification procedures. A second cause of the losses is occlusion of the potassium chloride in the sodium chloride tailings.

Tailing ponds are used to collect the excess brine of saturated sodium chloride and potassium chloride with the brine usually being deep well injected for disposal. As an example, for every 1,000,000 tonnes of potassium chloride produced, between 80,000 and 100,000 tonnes of potassium chloride is disposed of by deep well injection.

Generally known techniques are deficient in any clear teachings regarding the methodology set forth above having the following commercial and industrial advantages:

a) production of useful salts from material typically discarded;
b) avoidance of the requirement for deep well injection;
c) use of a nominal amount of energy to synthesize product;
d) use of common equipment widely employed in chemical engineering unit operations; and
e) environmentally friendly protocol devoid of operations which generate pollutants or otherwise adversely affect the soil or air.

There is, therefore, a clear need for a process having these desirable properties; the present invention addresses these needs in an elegant and environmentally conscious manner.

SUMMARY OF THE INVENTION

One object of the present invention is to provide an improved method for formulating useful alkali salts from waste potassium chloride.

A further object of one embodiment of the present invention is to provide a method for forming potassium sulfate from potash brines, comprising the steps of:

providing a source of sodium chloride and potassium chloride in a first step;
reacting the sodium chloride and potassium chloride with calcium sulfate and sodium sulfate;
forming a syngenite precipitate and a first filtrate;
treating the syngenite precipitate with ammonia and carbon dioxide at between 60° C. and 100° C.;
forming calcium carbonate precipitate and a second filtrate;
cooling the second filtrate to a temperature of between 0° C. and 40° C.;
treating the second filtrate with potassium chloride crystals; and
forming potassium sulfate precipitate and a third filtrate.

A further object of one embodiment of the present invention is to provide a method for forming potassium sulfate and sodium bicarbonate from potash brines, comprising the steps of:

forming potassium sulfate in a first phase and sodium bicarbonate in a second phase, the first phase, comprising the steps of:
providing a source of sodium chloride and potassium chloride in a first step;
reacting the sodium chloride and potassium chloride with calcium sulfate and sodium sulfate;
forming a syngenite precipitate and a first filtrate;
treating the syngenite precipitate with ammonia and carbon dioxide at between 50° C. and 100° C.;
forming calcium carbonate precipitate and a second filtrate;
cooling the second filtrate to a temperature of between 0° C. and 40° C.;
treating the second filtrate with potassium chloride solid;
forming potassium sulfate precipitate and a third filtrate, said second phase comprising the steps of:
treating the first filtrate with ammonia or ammonium ions and carbon dioxide; and
forming sodium bicarbonate precipitate.

Having thus described the invention, reference will now be made to the accompanying drawing illustrating preferred embodiments.

BRIEF DESCRIPTION OF THE DRAWINGS

Similar numerals employed in the text denote similar elements.

DETAILED DESCRIPTION OF THE PREFERRED EMBODIMENTS

Figure 1:
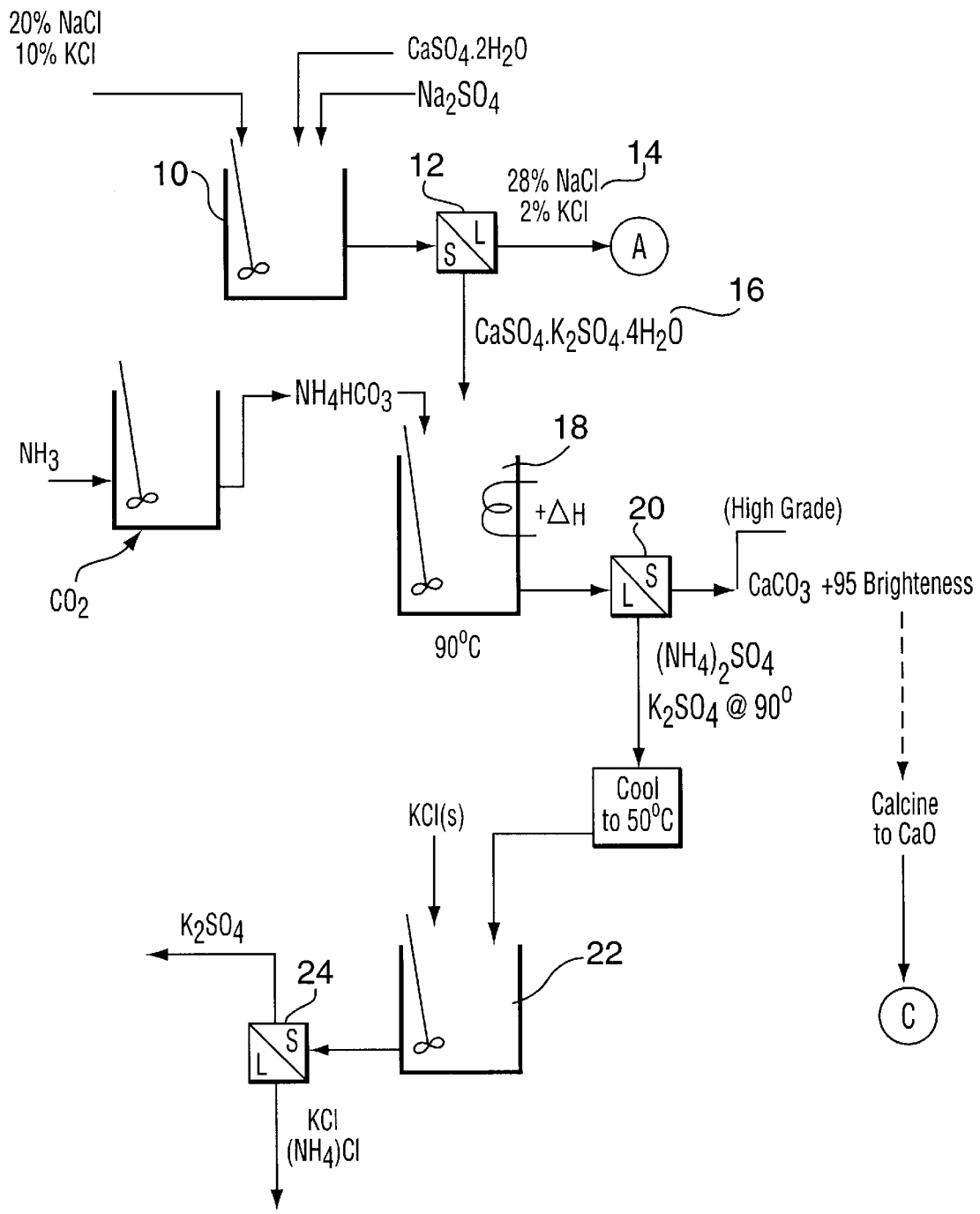
FIG. 1 illustrates an overall schematic representation of the method according to one embodiment of the present invention.

Referring now to FIG. 1, shown is an overall schematic representation of the process according to one embodiment. All amounts are expressed on a percentage by weight basis unless otherwise indicated.

In the embodiment shown, approximately 20% sodium chloride and 10% potassium chloride are added to a mixer 10 together with hydrated calcium sulfate and sodium sulfate. The mixture is filtered in filter 12, with the filtrate 14 undergoing subsequent treatment (discussed herein after). The precipitate 16 comprises syngenite, $CaSO_4$—$K_2SO_4 xH_2O$, and is reacted in vessel 18 with ammonia and carbon dioxide, as an example. The syngenite may also be reacted with ammonium bicarbonate. The reaction preferably is conducted at a temperature of between 30° C. and 100° C. and most desirably at 90° C. The mixture is filtered in filter 20, with the precipitate comprising calcium carbonate high grade having a brightness of at least +80. The calcium carbonate is subsequently treated by further unit operations to be discussed herein after.

The filtrate from filter 20 is cooled to a temperature of between 20° C. and 40° C. and most desirably at 30° C. Once cooled, the filtrate is reacted in vessel 22 with potassium chloride and filtered in filter 24 to provide a potassium sulfate precipitate and a filtrate containing potassium chloride and ammonium chloride.

Figure 2:
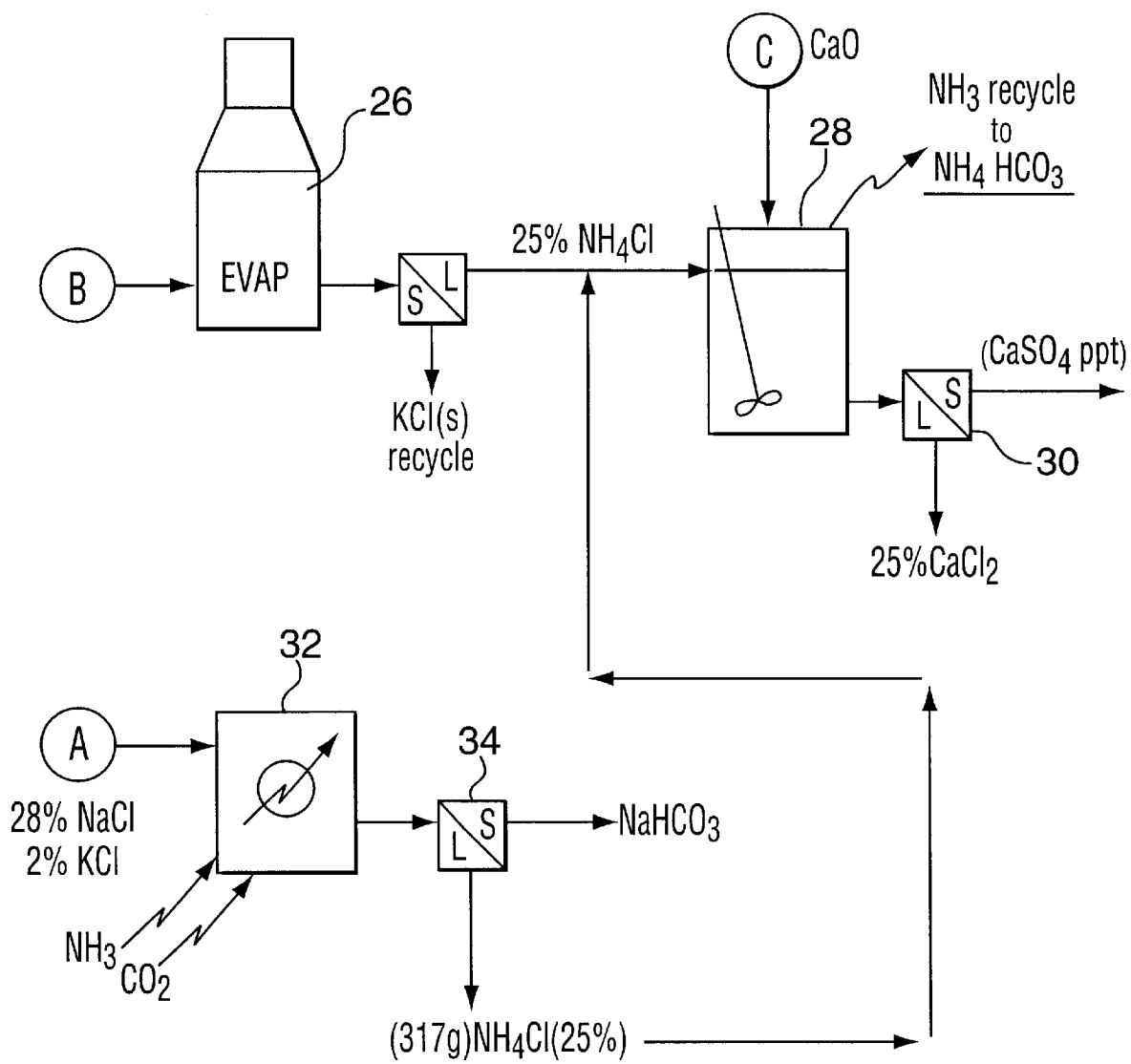
FIG. 2 is a detailed schematic of FIG. 1.

Referring now to FIG. 2, the filtrate containing potassium chloride and ammonium chloride is concentrated in an evaporator 26 and filtered in filter 28. The precipitate comprising potassium chloride is recycled to vessel 10 and the filtrate comprising approximately 25% ammonium chloride is passed into vessel 28. Calcium carbonate from the filtration step at filter 20 is calcined to yield lime and added to vessel 28. Ammonia gas formed is recycled to ammonium bicarbonate and the mixture is filtered in filter 30. The precipitate of calcium sulfate is reused and the filtrate, comprising calcium chloride (25%) is disposed of by, for example, deep well injection.

The filtrate from filter 12 (approximately 28% sodium chloride and 2% potassium chloride) is reacted with ammonium bicarbonate (ammonia and carbon dioxide) in vessel 32 and filtered in filter 34. The result is a precipitate of sodium bicarbonate and ammonium chloride filtrate. The sodium bicarbonate is, for example, calcined to yield sodium carbonate.

As a illustration of the efficacy of the technology set forth herein, the following is representative of the quantitative result.

EXAMPLE

Sample Calculation $$\text{Feed Brine @ } \begin{matrix} 21\% \text{ NaCl} \\ 10\% \text{ Kcl} \end{matrix} \bigg\} \text{ At } 1.24 \; 5.6$$

Basis: One $(M)^3$ of Feed Brine $$\therefore \text{ tonnes of NaCl} = 1 \times 1.24 \times 0.21 = 0.260 \text{ t}$$
$$\text{tonnes of KCl} = 1 \times 1.24 \times 0.10 = 0.124 \text{ t}$$
$$\text{tonnes of } H_2O = \underline{0.856 \text{ t}}$$
$$\text{Total} = 1.24 \text{ t}$$

Reaction with $CaSO_4 \cdot 2H_2O + Na_2SO_4 + KCl \rightarrow Ca_2SO_4 \cdot K_2SO_4 \cdot xH_2O + NaCl\, 0.1$ t KCl enter into the reaction $$\therefore CaSO_4 \cdot 2H_2O \text{ required} = \frac{0.1}{74(2)} \times 172 = \underline{0.116 \text{ t}}$$
$$Na_2SO_4 \text{ required} = \frac{0.1}{74(2)} \times 142 = \underline{0.096 \text{ t}}$$

Syngenite produced: (as) $Ca_2SO_4K_2SO_4 \cdot 4H_2O$ $$\frac{0.1}{74(2)} \times 382 = \underline{0.258 \text{ t}} \text{ of wet cake}$$

The filtered exit brine contains: 0.024 t KCl
0.338 t NaCl
% NaCl = 27.7    0.856 t $H_2O$
% KCl = 2.0      1.218 t Syngenite conversion @+90° C.

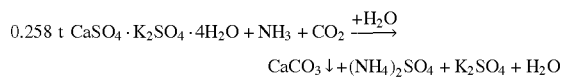

$CaCO_3 \downarrow + (NH_4)_2SO_4 + K_2SO_4 + H_2O$

-continued $$NH_3 \text{ required} = \frac{0.258}{382} \times (2) \times 17 = 0.023 \text{ t}$$
$$CO_2 \text{ required} = \frac{0.258}{382} \times 44 = 0.030 \text{ t}$$
$$CaCO_3 \text{ produced} = \frac{0.258}{382} \times 100 = \underline{0.067} \text{ t}$$
$$(NH_4)_2SO_4 \text{ produced} = \frac{0.258}{382} \times 132 = \underline{0.089} \text{ t}$$
$$K_2SO_4 \text{ produced} = \frac{0.258}{382} \times 174 = \underline{0.137} \text{ t}$$

Filtered Solution $$\therefore \frac{0.137}{0.18} = 0.761 | \text{ of } \underline{H_2O}$$

Brine make-up is = 0.137 t $K_2SO_4$
0.089 t $(NH_4)_2SO_4$
$\underline{0.761}$ t $H_2O$
0.987 t Brine
% $K_2SO_4$ = 13.88%
% $(NH_4)_2SO_4$ = $\underline{9.00\%}$
Total salts = 22.88%

Conversion of $(NH_4)_2SO_4$ to $K_2SO_4$
The solution is cooled to 30° C.
KCl that reacts with $(NH_4)_2SO_4$=0.100 t
This makes 0.070 t $NH_4Cl$.
Solubility of Cl salts @ 25° C. is 24%
7.09% is $NH_4Cl$, 17% needs to added.

Solid KCl addition 1) 0.010 t for reaction
2) $\underline{0.168 \text{ t}}$ for common ion crystallization
Total = 0.178 t KCl $K_2SO_4$ Crystallization Brine Composition at Exit 0.168 t KCl
0.070 t $NH_4Cl$
0.020 t $K_2SO_4$
$\underline{0.761}$ t $H_2O$
1.019 t Brine $K_2SO_4$ Production
0.137 t+0.118−0.02=0.235 t
Recovery of KCl from $(NH_4)Cl$ brine at 30% $NH_4Cl$, KCl is 1%

$$\therefore \frac{0.07 \text{ t}}{(0.761 - x)} = 0.30$$
$$0.07 = 0.2283 - 0.3x$$
$$x = 0.527$$

Therefore: 0.527 tonnes of $H_2O$ is to evaporated for every 0.237 t of $K_2SO_4$ production.

Evaporative hood 2.22 tonnes $H_2O$ per tonne of $K_2SO_4$
KCl solid is recycled to the $K_2SO_4$ production step.

The ammonium chloride is now reacted with lime. (CaO)

0.07 t $NH_4Cl$ + 0.038 t CaO → 0.074 t $CaCl_2$ + 0.023 t $NH_3\uparrow$ 0.023 t of $NH_3$ gas is recycled and a 30% brine of $CaCl_2$ is sold or disposed of.

The $CaCO_3$ precipitated from this process maybe washed and sold as high grade precipitated $CaCO_3$ for paper coatings or recycled by drying and calcining to produce CaO. The $CO_2$ may be recovered and recycled using conventional amines.

The exit brine from the syngenite conversion, namely the: 27.7% NaCl

S.G. 1.218 @ 25° C.            2.0% KCl

Solid NaCl may be added to upgrade saturation, but this is not critical.

This brine is cooled to between 0 and 10° C. and reacted with $NH_3$ and excess $CO_2$ or $NH_4HCO_3$.

The process will react with about 90% of the NaCl.

$\therefore 27.7 \times 0.9 = 24.93\%$ NaCl reacts to produce:

$$\frac{1.218 \times 0.2493}{58} \times 84 = 0.440 \text{ t NaHCO}_3$$

Solubility of $NaHCO_3$ @ 0° C. is 5%.

$\therefore 1.218 \times 0.05 = 0.061$ t $NaHCO_3$ (liquid)

yield of $NaHCO_3$ crystals = 0.44 − 0.061

= 0.379 t $NaHCO_3$ $NaHCO_3$ yield = $\frac{0.379}{0.44} \times 100 = 86.1\%$

Ammonium Chloride Brine Produced $$\frac{1.218 \times 0.2493}{58} \times 52 = 0.272 \text{ t NH}_4\text{Cl}$$

$1.218 \times 0.0277 = 0.034$ t NaCl $1.218 \times 0.02 = 0.024$ t KCl $1.218 \times 0.05 = 0.061$ t $NaHCO_3$ 0.827 t $H_2O$ 1.218 t Lime required 1) for $NH_4Cl$  $\frac{0.272}{53(2)} \times 56 = 0.144$ t lime 2) for $NaHCO_3$  $\frac{0.061}{(84)(2)} \times 56 = 0.020$ t lime Total = 0.164 t lime $CaCl_2$ brine produced = 0.282 t $CaCl_2$ = 0.076 t NaCl = 0.024 t KCl 23.3% $CaCl_2$ = 0.827 t $H_2O$ 1.209 t This brine can be combined with the exit from the KCl recovery step and further processed to sell $CaCl_2$ or disposed of.

Ammonia Recycled $$\frac{0.272}{53} \times 17 = 0.0872 \text{ t NH}_3$$

The requirements for $CO_2$ can be made up by recovering $CO_2$ from calcining $CaCO_3$ or by using amine stripping units to recover $CO_2$ from exhaust gas streams.

Key Numbers for Processing

One $(m)^3$ of 1.24 S.G. brine of saturated KCl and NaCl $K_2SO_4$ produced = 0.235 t $NaHCO_3$ produced = 0.379 t Lime used as CaO = 0.202 t as $CaCO_3$ = 0.361 t Evaporative load 2.2 t $H_2O$ t $K_2SO_4$ Recycle $NH_3$ = 0.157 t Although embodiments of the invention have been described above, it is not limited thereto and it will be apparent to those skilled in the art that numerous modifications form part of the present invention insofar as they do not depart from the spirit, nature and scope of the claimed and described invention.

I claim:

1. A method for forming potassium sulfate from potash brines, comprising the steps of:
   providing a source of sodium chloride and potassium chloride in a first step;
   reacting said sodium chloride and potassium chloride with calcium sulfate and sodium sulfate to form a syngenite precipitate and a first filtrate;
   treating said syngenite precipitate with ammonium bicarbonate at between 60° C. and 100° C. to form calcium carbonate precipitate and a second filtrate;
   cooling said second filtrate to a temperature of between 0° C. and 40° C.; and
   treating said second filtrate with potassium chloride crystals to form potassium sulfate precipitate and a third filtrate.

2. The method as set forth in claim 1, wherein said syngenite precipitate is treated with ammonium bicarbonate at a temperature of 90° C.

3. The method as set forth in claim 1, wherein said first filtrate contains sodium chloride and potassium chloride.

4. The method as set forth in claim 3, further including the step of treating said first filtrate with ammonium bicarbonate to produce a sixth filtrate comprising ammonium chloride and a precipitate of sodium bicarbonate.

5. The method as set forth in claim 4, further including the step of calcining said sodium bicarbonate to form sodium carbonate.

6. The method as set forth in claim 1, wherein said second filtrate is cooled to a temperature of 30° C.

7. The method as set forth in claim 1, wherein said third filtrate contains ammonium chloride and potassium chloride.

8. The method as set forth in claim 7, further including the step of concentrating said third filtrate by evaporation to form a fourth filtrate and potassium chloride precipitate.

9. The method as set forth in claim 8, further including the step of recycling potassium chloride precipitate to said first step.

10. The method as set forth in claim 7, further including the step of calcining said calcium carbonate to form lime.

11. The method as set forth in claim 10, wherein said fourth filtrate is treated with lime to produce a fifth filtrate comprising calcium chloride and a precipitate of calcium sulfate.

12. The method as set forth in claim 1, wherein said calcium carbonate comprises high grade calcium carbonate having a brightness of between +80 and +95.

13. A method for forming potassium sulfate and sodium bicarbonate from potash brines, comprising the steps of:

forming potassium sulfate in a first phase and sodium bicarbonate in a second phase, said first phase, comprising the steps of:

providing a source of sodium chloride and potassium chloride in a first step;

reacting said sodium chloride and potassium chloride with calcium sulfate and sodium sulfate to form a syngenite precipitate and a first filtrate;

treating said syngenite precipitate with ammonium bicarbonate at between 50° C. and 100° C. to form calcium carbonate precipitate and a second filtrate containing ammonium sulfate and potassium sulfate;

cooling said second filtrate to a temperature of between 0° C. and 40° C.;

treating said second filtrate with potassium chloride solid to form potassium sulfate precipitate and a third filtrate, said second phase comprising the steps of:

treating said first filtrate with ammonium bicarbonate to form sodium bicarbonate precipitate.

14. The method as set forth in claim 13, further including the step of calcining said sodium bicarbonate to sodium carbonate.

15. The method as set forth in claim 13, wherein said second filtrate is cooled to a temperature of 30° C.

16. The method as set forth in claim 13, wherein said syngenite is treated at a temperature of 90° C.

* * * * *